United States Patent [19]

Sikora

[11] Patent Number: 4,839,782

[45] Date of Patent: Jun. 13, 1989

[54] WEATHERPROOF LIGHTING FIXTURE WITH HERMETICALLY SEALED BASE PLATE

[75] Inventor: Thomas R. Sikora, Mesa, Ariz.

[73] Assignee: Tomar Electronics, Inc., Tempe, Ariz.

[21] Appl. No.: 311,459

[22] Filed: Feb. 11, 1989

Related U.S. Application Data

[63] Continuation of Ser. No. 139,286, Dec. 29, 1987, abandoned.

[51] Int. Cl.$^4$ ............................................. F21Y 17/06
[52] U.S. Cl. .................................. 362/363; 362/368; 362/433
[58] Field of Search ................ 362/74, 158, 267, 268, 362/339, 368, 363, 433, 455

[56] References Cited

U.S. PATENT DOCUMENTS

| | | | |
|---|---|---|---|
| 1,906,188 | 4/1933 | Smally | 362/363 |
| 2,773,172 | 12/1956 | Pennow | 362/363 |
| 3,221,162 | 11/1965 | Heenan et al. | 362/268 |
| 3,253,138 | 5/1966 | Nagel | 362/268 |
| 3,271,735 | 9/1966 | Gosswiller | 362/74 |
| 4,499,527 | 2/1985 | Tauber et al. | 362/267 |

Primary Examiner—Ira S. Lazarus
Assistant Examiner—Richard R. Cole
Attorney, Agent, or Firm—Cahill, Sutton & Thomas

[57] ABSTRACT

An optically transmissive, substantially cylindrical enclosure surrounds a light source. A generally circular base includes a vertically oriented first flange section dimensioned to fit coaxially within a vertically oriented lower section of the enclosure. The base includes a horizontally oriented, second flange section coupled to the first flange section and oriented perpendicular to the longitudinal axis of the lightning fixture. A circular clamp compresses a resilient gasket between a lower, horizontally oriented surface of the enclosure and the horizontally oriented second flange section of the base to create an hermetic seal between the base and the light fixture enclosure.

10 Claims, 2 Drawing Sheets

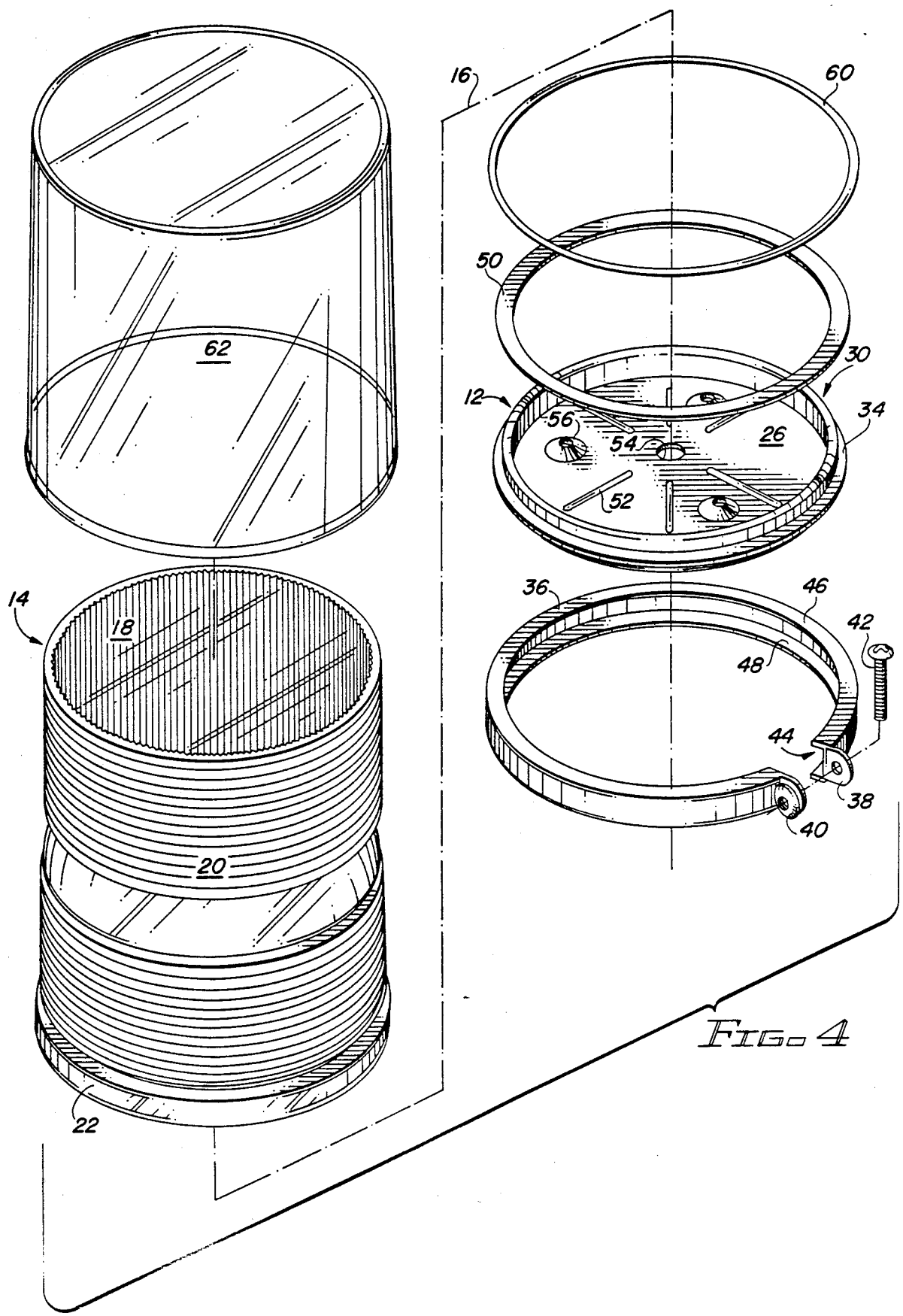

WEATHERPROOF LIGHTING FIXTURE WITH HERMETICALLY SEALED BASE PLATE

This is a continuation of application Ser. No. 139,286, filed Dec. 29, 1987 now abandoned.

BACKGROUND OF THE INVENTION

This invention relates to weatherproof lighting fixtures, and more particularly, to weatherproof lighting fixtures providing an hermetic, weatherproof seal between an optically transmissive enclosure and a load supporting base.

DESCRIPTION OF THE PRIOR ART

Outdoor lighting fixtures of the type typically used to provide a sealed, weatherproof environment for an electrically energized strobe light include an optically transmissive enclosure in combination with a load bearing base. In order to focus the output beam from the enclosed lighting source, a Fresnel lens including a plurality of angled, faceted surfaces is formed in the exterior surface of the light fixture enclosure. A variety of other multi-element converging lens systems may also be utilized to accomplish the same purpose.

Since weatherproof light fixtures of this type are frequently attached to police cars, fire engines or ambulances or are secured to the exterior of buildings or used in other outdoor applications, the multi-element lens systems of these lighting fixtures becomes contaminated with dirt and moisture which substantially degrades the optical performance of the lens system.

Such weatherproof strobe lighting fixtures are required to withstand vehicle cleaning activities involving automated vehicle washing systems or high pressure spray cleaning systems.

To prevent water contamination or short circuiting the electrical components of strobe lighting system power supplies typically housed within such enclosures, it is important that all physical junctions between the different parts of the lighting fixture be hermetically sealed to prevent entry of potentially destructive water.

SUMMARY OF THE INVENTION

It is therefore a primary object of the present invention to provide a weatherproof lighting fixture having an optically transmissive enclosure and a load supporting base with a hermetic seal between the enclosure and its supporting base.

It is another object of the present invention to provide a weatherproof lighting fixture having an enclosure to base hermetic seal which can be incorporated into existing lighting fixtures for a nominal cost.

Another object of the present invention is to provide a weatherproof lighting fixture which utilizes a uniquely contoured base having a first vertically oriented flange and a second horizontally oriented flange which operate in combination to create a precisely aligned, sealing surface between the base and the enclosure.

Briefly stated, and in accord with one embodiment of the invention, a weatherproof lighting fixture encloses and supports a light source. An optically transmissive, substantially cylindrical enclosure for the light source includes a longitudinal axis, a closed upper surface centered about the longitudinal axis, a body centered about the longitudinal axis and extending downward from the upper surface and including a substantially flat lower surface oriented perpendicular to the longitudinal axis. The lower surface of the lower section of the body commences at a first radial distance from the longitudinal and terminates at a second radial distance from the longitudinal axis. A circular base includes a circular disc section which is centered about the longitudinal axis and includes an upper surface. The disc section terminates at a third radial distance from the longitudinal axis. The circular base also includes a vertically oriented, circular first flange section which is centered about the longitudinal axis and is coupled to the disc section. The first flange section includes an outer surface located at a fourth radial distance from the longitudinal axis. The fourth radial distance is slightly shorter than the first radial distance and enables the first flange section to fit coaxially within the lower section of the enclosure. A horizontally oriented, circular second flange section is coupled to and extends outward from the first flange section and includes an upper surface for contacting the lower surface of the enclosure. A clamping device engages both the enclosure and the base the biases the upper surface of the second flange section into firm contact with the lower surface of the enclosure.

DESCRIPTION OF THE DRAWINGS

The invention is pointed out with particularity in the appended claims. However, other objects and advantages together with the operation of the invention may be better understood by reference to the following detailed description taken in conjunction with the following illustrations, wherein:

FIG. 4 is an exploded perspective view illustrating the manner in which the component parts of the lighting fixture interface with one another.

DETAILED DESCRIPTION OF THE INVENTION

Figure 1:
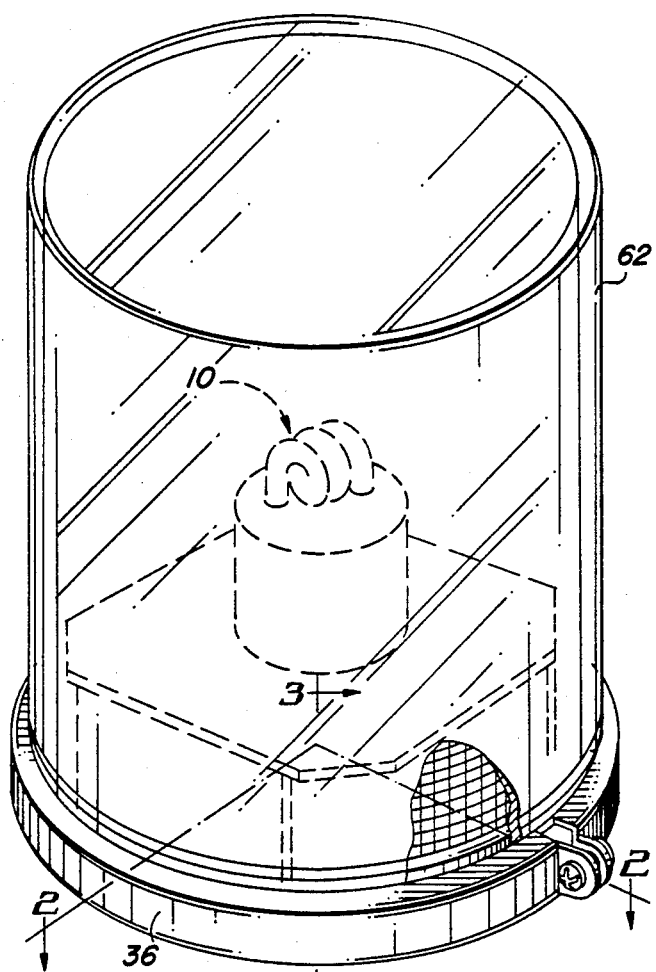
FIG. 1 is a perspective view of the lighting fixture of the present invention.

In order to better illustrate the advantages of the invention and its contributions to the art, the various mechanical features of a preferred embodiment of the invention will now be reviewed in detail.

A light source 10 is physically coupled to a supporting base 12 fabricated from stainless steel formed into the depicted shape by a single stamping operation.

As illustrated in FIG. 4, an optically transmissive, substantially cylindrical enclosure 14 is symmetrically oriented with respect to a longitudinal axis 16 and includes a closed upper surface 18 which is centered about longitudinal axis 16.

Figure 3:
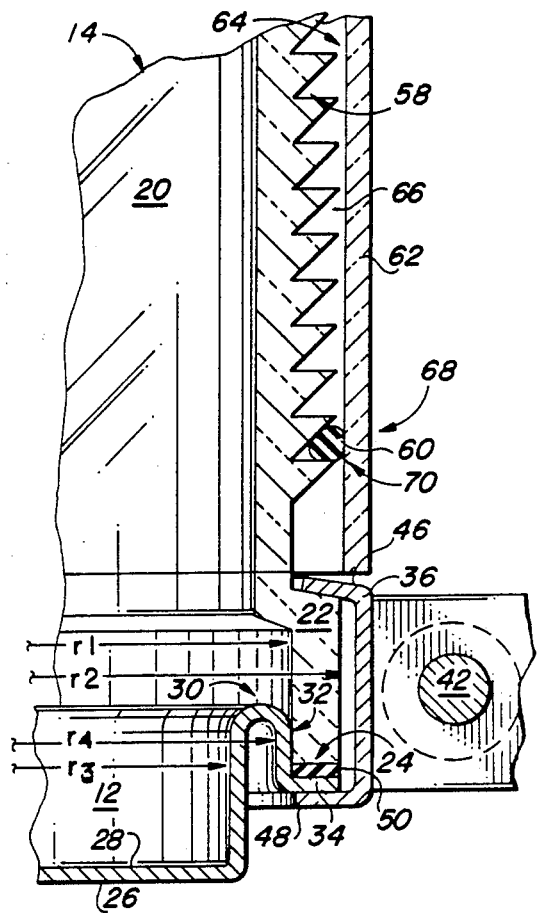
FIG. 3 is a partially cut away sectional view of the lighting fixture illustrated in FIG. 1, taken along section lines 3—3.

Enclosure 14 further includes a body 20 which is centered about longitudinal 16 and which extends downward from upper surface 18. As illustrated in FIG. 3, the body 20 of enclosure 14 includes a lower section generally designated by reference number 22 which includes a substantially flat lower surface 24 which is oriented perpendicular to longitudinal axis 16. Lower surface 24 commences at a first radial distance $r_1$ from axis 16 and terminates at a second radial distance $r_2$ from axis 16.

Figure 2:
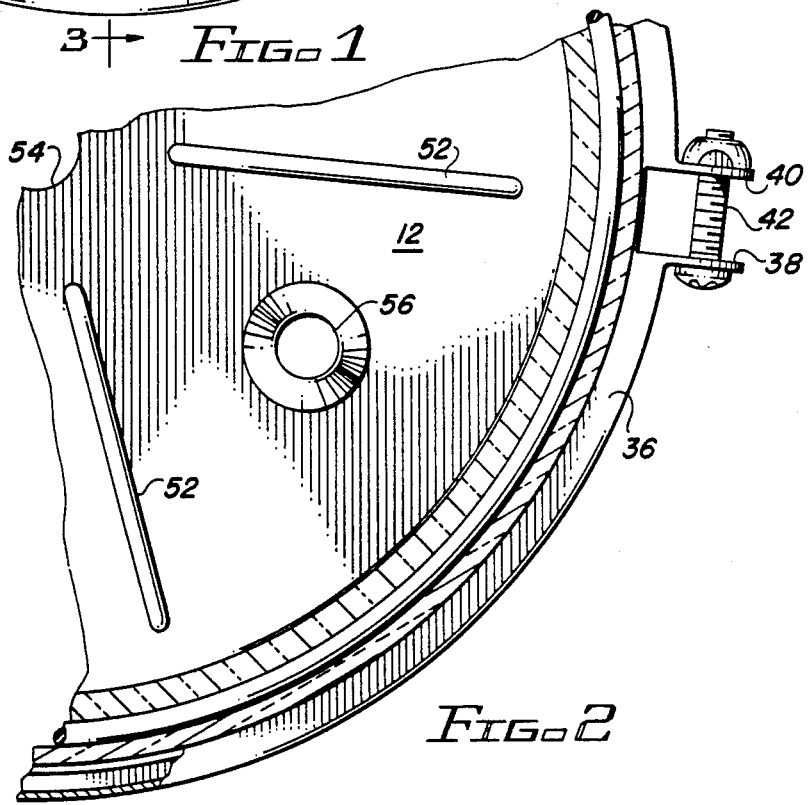
FIG. 2 is a partially cut away elevational view of the lighting fixture depicted in FIG. 1, taken along section lines 2—2.

As illustrated in FIGS. 2 and 4, base 12 is formed in a circular configuration and includes a circular disc section 26 centered about axis 16 which includes an upper surface 28 and which terminates at a third radial distance $r_3$ from axis 16.

As illustrated in FIGS. 3 and 4, vertically oriented, circular first flange section 30 is centered about longitudinal axis 16 and coupled to disc section 16. First flange section 30 includes a vertically oriented, outer surface 32 which is located at a fourth radial distance $r_4$ from longitudinal axis 16. Radial distance $r_4$ is approximately equal to or slightly shorter than radial distance $r_1$ and enables first flange section 30 to fit coaxially within lower section 22 of body 20. The U-shaped, curved space between the inner wall of first flange section 30 at radial distance $r_3$ and its outer wall at radial distance $r_4$ defines a horseshoe bend and forms an unobstructed, inverted U-shaped gap in the single piece steel base 12.

A horizontally oriented, circular second flange section 34 is coupled to and extends outward from first flange section 30 and includes an upper surface for contacting the lower surface 24 of enclosure 14. Second flange section 34 is positioned at a horizontal elevation above disc section 26 and below the upper extremity of the horseshoe bend in first flange section 30.

Clamping means in the form of an open circle, C-shaped steel clamp 36 includes a first end 38 and a second end 40. End 40 includes a threaded aperture for receiving machine screw 42 which serves to vary the spacing between ends 38 and 40 to control the clamping forces exerted by clamp 36. As illustrated in FIG. 4 by reference number 44, clamp 36 includes a C-shaped cross section having an upper clamping surface 46 and a lower clamping surface 48. Upper clamping surface 46 engages a matching, inclined surface disposed on the upper part of lower section 22 of body 20 while lower clamping surface 48 engages the lower surface of second flange section 34.

A circular rubber or neoprene gasket 50 is disposed between lower surface 24 and second flange section 34 to form a water impervious seal between base 12 and enclosure 14.

A plurality of ribs 52 are radially disposed about the surface of disc section 26 to reinforce and rigidize that section of base 12. A circular aperture 54 is disposed in the center of disc section 26 to enable electrical interconnecting cables to pass into the interior of the lighting fixture and to be coupled to light source 10. A plurality of upwardly dished apertures 56 are also disposed in disc section 26 to enable the light fixture to be mechanically secured to a solid body. Neoprene grommets, gaskets or equivalent sealant materials will typically be disposed in upwardly dished recesses surrounding dished apertures 56 in order to maintain the watertight seal between the interior and exterior of the lighting fixture.

Body 20 is typically fabricated from optically transmissive glass or plastic having either transparent or optically tinted color characteristics. A Fresnel or equivalent light collimating lens is formed in the exterior surface of body 22 and includes a plurality of non-linear lens elements 58. In the embodiment depicted in FIG. 3, lens elements 58 take the form of a series of lens facets of alternating, but repetitive inclination angles.

In one embodiment of the invention, compressible, O-ring sealing means 60 is dimensioned to fit into and form a seal with a grooved surface disposed at a location at or below the lowermost extremity of lens elements 58. In one embodiment of the invention, O-ring sealing means 60 can be fitted into the circular, grooved surface defined by adjacent, inclined facets of lens elements 58. In another embodiment of the invention not shown in the drawings, a special circular grooved surface having either a smooth U-shaped contour or inclined, faceted surfaces of the type depicted in FIG. 3 could be located below lens elements 58 to receive O-ring sealing means 60.

A substantially cylindrical, optically transmissive cover 62 includes an interior surface 64 dimensioned to fit coaxially over enclosure 14. The coaxial fit between the interior surface 64 of cover 62 and the outer lens surface of enclosure 14 defines a chamber 66 between enclosure 14 and cover 62.

As illustrated in FIG. 3, the lower section of cover 62 generally designated by reference number 68 is dimensioned to overlie the lower section of enclosure 14 where O-ring sealing means 60 is disposed. The inner surface 70 of cover 62 is dimensioned to engage and be compressed against O-ring sealing means 60 to create a weatherproof seal between the outer surface of enclosure 14 and the corresponding inner surface of cover 62 to prevent the introduction of dirt or moisture into the chamber 66.

As a result of the unique structure of the lighting fixture of the present invention, the interference fit between the vertically oriented, outer wall of first flange section 30 of base 12 and the vertically oriented inner wall of lower section 22 of enclosure 14 creates a self-alignment feature between base 12 and enclosure 14 and facilitates the rapid, accurate installation of base 12 to enclosure 14 while maintaining precise mechanical alignment between lower surface 24 of body 20, second flange section 32 and sealing gasket 50. This self-aligning feature ensures the creation of a highly reliable, hermetic seal between base 12 and enclosure 14.

The unique structure of the seal created by the compressive, interference fit between O-ring sealing means 60, the lens elements 58 of enclosure 14 and the inner wall 64 of transparent plastic cover 62 not only provides a weathertight hermetic seal at the lower extremity of chamber 66, but also provides a firm mechanical coupling between enclosure 14 and cover 62 which by itself secures cover 62 to enclosure 14. The unique configuration of this aspect of the invention also permits existing lighting fixtures incorporating only an enclosure 14 with lens elements 58 to be readily converted to a weatherproof lighting fixture having a cover 62, an O-ring sealing means 60 and an hermetically sealed chamber 66 for preventing dirt and oisture from contaminating and blocking the angled faceted surfaces and grooves defined by the various lens elements 58. The completely smooth exterior surface of cover 62 enables it to be readily cleaned by high pressure washing apparent without permitting the introduction of dirt or moisture into sealed chamber 66.

It will be apparent to those skilled in the art that the disclosed weatherproof lighting fixture may be modified in numerous ways and may assume many embodiments other than the preferred forms specifically set out and described above. Accordingly, it is intended by the appended claims to cover all such modifications of the invention which fall within the true spirit and scope of the invention.

I claim:

1. A weatherproof lighting fixture for enclosing and supporting a light source, comprising:

a. an optically transmissive, substantially cylindrical enclosure for said light source including
   i. a longitudinal axis;
   ii. a closed upper surface centered about the longitudinal axis;
   iii. a body centered about the longitudinal axis, extending downward from said upper surface and including a lower section having an outer surface and a substantially flat lower surface oriented perpendicular to the longitudinal axis, said lower surface commencing at a first radial distance from the longitudinal axis and terminating at a second radial distance from the longitudinal axis;
b. a circular base formed from a thin metal sheet and including
   i. a circular disc section centered about the longitudinal axis, having an upper surface and terminating at a third radial distance from the longitudinal axis;
   ii. a circular first flange section centered about the longitudinal axis and having an upwardly extending, vertically oriented inner surface coupled to said disc section at the third radial distance, said first flange section including a downwardly extending, vertically oriented outer surface joined to the inner surface and located at a fourth radial distance from the longitudinal axis where the fourth radial distance is approximately equal to or slightly shorter than the first radial distance for enabling said first flange section to fit coaxially within the lower section of said enclosure, the space between the inner and outer surfaces defining an unobstructed downwardly facing U-shaped gap located entirely within the first radial distance with vertically oriented, parallel sidewalls, a peak evaluation and a width;
   iii. a horizontally oriented, circular second flange section defining the bottom of the U-shaped gap, having an inner surface coupled to and extending outward from said first flange section and having an upper surface for supporting the lower surface of said enclosure, the second flange section being elevated above the disc section and passively supporting the enclosure from below without contacting or exerting force on the outer surface of the lower section of said body, the distance between the bottom and the peak elevation of the U-shaped gap exceeding the width of the U-shaped gap; and
c. clamping means having an upper clamping surface engaging the lower section of said enclosure and a lower clamping surface extending below and under the second flange section of said base to firmly bias the upper surface of said second flange section toward the lower surface of said enclosure to form a horizontally oriented weatherproof seal between the flat lower surface of the body and the horizontally oriented second flange section.

2. The lighting fixture of claim 1 further including sealing means disposed between the lower surface of said enclosure and the upper surface of said second flange section for forming a watertight seal between said base and said enclosure.

3. The lighting fixture of claim 2 wherein said metal sheet forming the circular base is fabricated from steel.

4. The lighting fixture of claim 2 wherein said sealing means includes a circular gasket.

5. The lighting fixture of claim 2 wherein said disc section includes a plurality of reinforcing ribs.

6. The lighting fixture of claim 2 wherein said second flange section commences at the first radial distance and terminates at the second radial distance.

7. The lighting fixture of claim 2 wherein said disc section includes a central aperture centered about the longitudinal axis.

8. The lighting fixture of claim 7 wherein said disc section includes a plurality of apertures disposed in said disc section symmetrically with respect to said central aperture at a radial distance of less than the third radial distance.

9. The lighting fixture of claim 1 wherein said clamping means includes a C-shaped cross section.

10. The lighting fixture of claim 9 wherein said clamping means is formed as an incomplete circular clamp having first and second ends and includes means coupled to said first and second ends for varying the spacing between said ends.

* * * * *